United States Patent [19]

Garcia et al.

[11] Patent Number: 5,334,404
[45] Date of Patent: Aug. 2, 1994

[54] PROCESS FOR TRANSFERRING IMAGES OF EDIBLE PASTE ONTO BAKED PASTRY SHEETS

[76] Inventors: Ruben Garcia; Felicia Garcia, both of 600 Grand Blvd., Deer Park, N.Y. 11729

[21] Appl. No.: 11,716

[22] Filed: Feb. 1, 1993

[51] Int. Cl.$^5$ .......................... A21D 8/00; A21D 10/04
[52] U.S. Cl. ................................ 426/383; 426/249; 426/250; 426/87; 426/104; 426/811
[58] Field of Search ................ 426/383, 104, 87, 811, 426/389, 249, 250

[56] References Cited

U.S. PATENT DOCUMENTS

| | | | |
|---|---|---|---|
| 919,736 | 4/1909 | Loesch | 426/87 |
| 3,537,406 | 11/1970 | Ort | 426/383 |
| 3,852,494 | 12/1974 | Williamson | 426/383 |
| 4,278,022 | 7/1981 | Fitzpatrick et al. | 426/383 |
| 4,285,978 | 8/1981 | Quinlivan | 426/383 |
| 4,560,562 | 12/1985 | Schroeder | 426/383 |
| 4,578,273 | 3/1986 | Krubert | 426/383 |
| 5,017,394 | 5/1991 | MacPherson et al. | 426/383 |
| 5,035,907 | 7/1991 | Phillips et al. | 426/383 |

FOREIGN PATENT DOCUMENTS

| | | | |
|---|---|---|---|
| 2165254 | 7/1973 | Fed. Rep. of Germany | 426/389 |
| 2900195 | 4/1980 | Fed. Rep. of Germany | 426/811 |
| 3515075 | 10/1986 | Fed. Rep. of Germany | 426/87 |
| 2648017 | 12/1990 | France | 426/104 |
| 47-16093 | 5/1972 | Japan | 426/383 |
| 48-1512 | 1/1973 | Japan | 426/87 |
| 58-134943 | 8/1983 | Japan | 426/104 |
| 59-11136 | 1/1984 | Japan | 426/104 |
| 59-21350 | 2/1984 | Japan | 426/104 |
| 59-151838 | 8/1984 | Japan | 426/104 |
| 59-183645 | 10/1984 | Japan | 426/104 |
| 59-53012 | 12/1984 | Japan | 426/104 |
| 60-126057 | 7/1985 | Japan | 426/104 |
| 60-137250 | 7/1985 | Japan | 426/104 |
| 62-36137 | 2/1987 | Japan | 426/104 |
| 62-138279 | 6/1987 | Japan | 426/383 |
| 63-87946 | 4/1988 | Japan | 426/104 |
| 150376 | 10/1989 | Japan | 426/104 |
| 292241 | 4/1990 | Japan | 426/104 |
| 297357 | 4/1990 | Japan | 426/104 |
| 3151830 | 6/1991 | Japan | 426/104 |
| 3187350 | 8/1991 | Japan | 426/104 |
| 3187351 | 8/1991 | Japan | 426/104 |
| 298862 | 5/1954 | Switzerland | 426/383 |
| 196885 | 9/1922 | United Kingdom | 426/383 |
| 786428 | 11/1957 | United Kingdom | 426/517 |

OTHER PUBLICATIONS

Bakers Weekly Jan. 23, 1956 p 19.
Food Industries Jan. 1951 p. 44 Plus.
Food Engineering Feb. 1956 p. 52 plus.

*Primary Examiner*—Steven Weinstein
*Attorney, Agent, or Firm*—John P. Halvonik

[57] ABSTRACT

The invention is a method for effectively transferring finely detailed images in edible pastes onto pastry shapes for decorative pastry dough that may be shaped into decorative pieces for various effects. The method comprises a first step of transferring the fine pattern images onto silk screen and then using silk screening methods to impart a paste onto specially developed, reusable, transfer sheets. Batter is then placed across the transfer sheets and then baked at approximately .350°–450° F. The images in edible paste are effectively transferred to the pastry without sticking to the sheet. The sheets are made of tetrafluorethylene coated fabric sheet and may be reused.

8 Claims, No Drawings

PROCESS FOR TRANSFERRING IMAGES OF EDIBLE PASTE ONTO BAKED PASTRY SHEETS

FIELD OF INVENTION

BACKGROUND OF THE INVENTION

The invention relates to the field of baking and in particular to a method for transferrring finely detailed images in edible paste onto pastry forms which may be shaped to fill a variety of purposes in the pastry field. It is found that silk screening methods offer a way to capture exquisitely detailed images in an edible form, viz. in a paste formed with cocoa powder and then baked onto pastry sheets to imprint the paste image on the sheets. Halftones and other fine details may be captured through such a process. However, the problem is that such fine details may be lost when the edible paste image is transferred from a tranfer sheet onto dough through baking. Even a minimal amount of sticking between the dough and/or the transfer sheet is likely to ruin such a fine image.

DESCRIPTION OF THE PRIOR ART

While there are transfer sheets that are used in the cooking industry, none that applicant is aware of utilize tetrafluoroethylene coated glass fabrics to provide a smooth transfer from transfer sheet to the baked dough form. Also, the use of a paste of oil and cocoa in the initial screening process provides a paste that may be readily imparted onto the transfer sheet and then baked back onto the dough.

SUMMARY OF THE INVENTION

A process for Transferring images in edible paste onto pastry sheets through baking. First, a silk screen is made of the image that is desired to be formed in edible paste. Then a paste of vegetable oil and cocoa powder is prepared and imprinted by silk screen process onto transfer sheets. It is possible that additives other than cocoa powder could be used, however, cocoa powder is preferred. These transfer sheets are used to tranfer the images of edible paste onto pastry sheets when baked in an oven. A batter having butter as a prime ingredient is then laid atop the sheet and both batter and sheet are placed in an oven at about 350°–450° F. for baking. After baking, the transfer sheet is removed and the fine pattern image remains in the pastry. The transfer sheets are of tetrafluoroethylene coated fabric variety.

The pastry shapes may be formed into thin crusts and then rolled or otherwise molded into shapes that can provide a variety of uses in pastries. These shapes may be rolled into cylindrical forms and used as side walls for cakes. The doughs may remain as flat sheets and function in that manner as well.

It is an object of the invention to provide a method of transferring fine line designs in edible paste onto dough forms.

Another object of the invention is to provide a transfer sheet that may be used to effectively transfer fine line designs of a cocoa powder and/or flour based edible paste onto dough through a baking process.

Another object is to provide a paste which serves as carrier for the and/or flour in order to provide an edible paste which can transfer easily from a transfer sheet to a pastry sheet.

Yet another objective is to provide a transfer sheet of a material that will not burn or otherwise be destroyed in a baking process in order to reuse such transfer sheets.

Another objective is to provide a transfer sheet that will effectively lift off from pastry after baking in order to transfer fine pattern images without damaging such images in the process.

Other objectives of the invention will become apparent to those skilled in the art once the invention has been shown and described.

DESCRIPTION OF THE PREFERRED EMBODIMENT

The tranfer sheets used in the process should be of a variety that will not stick and will not readily burn when used in the oven. It is found that these sheets should be made of tetrafluoroethylene coated glass baking fabric. One stock name for these type of fabrics is known as TFE-Glass fabric and is distributed by Ain Plastics, Inc. of Mt. Vernon, N.Y. 10550. It is advantageous to use these materials for transfer sheets as the sheets can be reused many times, possible up to a thousand times.

The batter should have an amount of butter or other lipid ingredient in it. Vegetable oil does not work well in this recipe it appears that the designs do not transfer as well. This provides a batter that will not stick to the tetrafluoroethylene coated fabric sheet. One suggested recipe is as follows: 4 eggs, 4 ounces of sugar, 4 ounces of all purpose flour (sifted), 1¼ tablespoon melted butter, 1 teaspoon vanilla. Eggs are better at room temperature, mix with wire whip at high speed, add the vanilla and the sugar, mix a few minutes, then at low speed add the flour, and then pour in the melted butter.

This mixture is found to make a batter that will pickup the edible paste image from the sheet quite well, capturing all the details of the halftone and fine lines in the image. The use of butter in the batter also provides that the baked dough will lift away from the transfer sheet with a minimum of sticking. This is essential when dealing with finely detailed images that may be produced by the silk screening method.

It is also found that this batter may be readily rolled into relatively thin sheets after the baking process. The resulting sheets are very versatile and may be rolled up into cylindrical forms or kept flat. They may also be readily cut into shapes. The use of versatile dough shapes enables the images to find their way into a variety of pastry forms. They baked sheet may be used as a side wall for a cake or cut into a circle it could go on the top. Other various uses may be made of such baked doughs without varying from the spirit of the invention.

Silk screen images may be made in the normal manner and may be taken of a great variety of patterns. Corporate logos may be imprinted through the process, snapshots of people, redundant designs, etc. These are only to name a few, other possible subjects for images will occur to those who practice the invention. The silk screen process is valuable in this regard since it can provide images with a high resolution. It is possible with the applicant's method to transfer halftones and other very fine lines to the dough. The resulting edible paste design is elegant and surprisingly detailed. This makes it an ideal decoration for pastries e.g. cakes, etc.

The silk screen used to transfer the edible paste is likely to be any state of the art type screen. An edible paste is laid across one end of the screen as ink would normally be laid out in the typical silk screen process. A squeegee or some other implement is then used to spread this edible paste across the length of the screen and by so doing, the edible paste is pressed through the screen and onto the transfer sheet. The squeeging process may use any state of the art implement commonly used in the silk screen industry.

The paste used should be one that can hold the cocoa powder and/or flour in liquid suspension in order for it to be imprinted onto the transfer sheet. It is found that the following recipe produces a paste that transfers well through the silk screen and may be lifted off of the transfer sheet quite readily when the baking time comes: ¼ cup of cocoa powder and/or flour, and 4 tablespoons of vegetable oil. These are mixed and this paste is used on the screen. Flour or cocoa powder may be used interchangeably, you may have all flour or all cocoa powder or some amount of both.

An alternate recipe for the edible paste calls for ¼ cup of cocoa and/or flour and 4 eggs slightly beaten. This may be used when the mesh in the screen is of relatively large variety or when using a stencil to transfer the image onto the transfer sheet. Of course, other recipes that call for similar proportions of the above ingredients on a larger or smaller scale may be used without varying from the spirit of the invention.

Different colored edible pastes may also be used to make colored designs as opposed to the cocoa powder or flour based paste which produces brown designs. A colored paste may be created by adding a few drops of food coloring to the above described batter recipe and then using this as the paste for the silk screening.

As stated above, it is also possible to use stencils of mylar, etc. to transfer the images in edible paste although such stencils would probably not produce as fine a pattern as the silk screen process.

The batter to be used is layered onto the fabric that now contains the paste image. The layers are approximately ¼" deep in the preferred embodiment. Bake the combination of the fabric, paste image and the sheet of batter at about 400° F. for about 15 minutes. An insulated pan should be used in order to avoid directly contacting with the heat. Failure to do so may result in drying the paste onto the fabric and it will not transfer. A double pan may also work as well as an insulated pan.

The above described process lends itself to mass production methods. For instance the transfer sheets may used over many times and the silk screens also have fairly long life, they may be used to imprint the same design on many sheets.

The batter itself may be changed in color by using food coloring in the basis batter recipe. One may also change the color of the batter by substituting flour for an amount of cocoa powder in order to lighten the shade of brown.

I claim:

1. A process for transferring images of edible paste onto pastry sheets which may be formed into useful pastry shapes having distinctive finely patterned designs in edible paste, the process comprising: a first step of making a silk screen image of said design; providing a edible paste mixture having a colored edible material; placing said edible paste mixture onto said silk screen and placing a transfer sheet beneath said silk screen, said transfer sheet having an upper side and an under side; spreading said edible paste mixture across said screen and onto said upper side of said transfer sheet to form said edible paste mixture into said design and print said design on said transfer sheet; then layering a batter onto and across said upper side of said transfer sheet and baking said batter and said transfer sheet in an oven at a temperature of about 350°–450° F. and for a time sufficient to transform said batter into a pastry sheet, said transfer sheet being made of material that will not burn at said baking temperatures and will allow the transfer of said design to said pastry sheet without sticking to the transfer sheet; removing said transfer sheet and said pastry sheet, after a time, from said oven and then removing said pastry sheet from said transfer sheet such that said design has been transferred from said transfer sheet to said pastry sheet to create a fine image on said pastry sheet.

2. The process of claim 1 wherein said edible paste mixture comprises vegetable oil and a colored component selected from the group consisting of cocoa power and flour.

3. The process of claim 2 wherein said transfer sheet is made of tetrafluoroethylene coated fabric.

4. The process of claim 1 wherein said edible paste mixture comprises eggs and a colored component selected from the group consisting of cocoa power and flour.

5. The process of claim 4 wherein said transfer sheet is made of tetrafluoroethylene coated fabric.

6. The process f claim 1 wherein said edible paste mixture comprises eggs, flour, and food coloring.

7. The process of claim 6 wherein said transfer sheet is made of tetrafluoroethylene coated fabric.

8. The process of claim 1 wherein said transfer sheet is made of tetrafluoroethylene coated fabric.

* * * * *